United States Patent [19]

Kazami et al.

[11] 4,302,085
[45] Nov. 24, 1981

[54] SHUTTER TIME ADJUSTMENT FOR A FLASH MODE AND/OR FILM-LEADER LOCATION

[75] Inventors: Kazuyuki Kazami, Tokyo; Yoshiaki Ohtsubo, Kawasaki; Yasunori Kitamura, Tokyo, all of Japan

[73] Assignee: Nippon Kogaku K.K., Tokyo, Japan

[21] Appl. No.: 121,653

[22] Filed: Feb. 15, 1980

[30] Foreign Application Priority Data

Feb. 23, 1979 [JP] Japan .............................. 54-21888[U]

[51] Int. Cl.³ .......................... G03B 7/00; G03B 9/62
[52] U.S. Cl. ....................................... 354/32; 354/38; 354/50; 354/215
[58] Field of Search ................... 354/32, 38, 50, 60 F, 354/60 R, 27, 126, 127, 129, 139, 149, 204, 212, 215, 217, 218

[56] References Cited

U.S. PATENT DOCUMENTS 4,096,492 6/1978 Land .................................... 354/139

Primary Examiner—L. T. Hix
Assistant Examiner—Stafford D. Schreyer
Attorney, Agent, or Firm—Fitzpatrick, Cella, Harper & Scinto

[57] ABSTRACT

In a photographic camera comprising an exposure time control circuit for controlling the shutter speed in response to the brightness of the object and a film frame number indicating device capable of indicating a usable range for frames allowing photographing operation and a non-usable range for frames not allowing photographing operation, wherein the shutter being controlled to a shutter speed independent from the shutter speed determined by said exposure time control circuit when said indicating device indicates said non-usable range, an improvement comprises a second exposure time control circuit for controlling the shutter with a shutter speed suitable for flash photographing and switch means for selecting the shutter speed control by the aforementioned exposure time control circuit or by said second exposure time control circuit in response to the indication of said indicating device in such a manner that the shutter is controlled by the shutter speed determined by said second exposure time control circuit when said indicating device indicates said non-usable range.

5 Claims, 2 Drawing Figures

SHUTTER TIME ADJUSTMENT FOR A FLASH MODE AND/OR FILM-LEADER LOCATION

BACKGROUND OF THE INVENTION

This invention relates to a shutter actuating apparatus for a camera which is provided with an automatic exposure control device.

Upon loading of film into a camera, there are required fictitious shots for taking up the exposed leader portion of the film after it is set on the winding mechanism. Such fictitious shots are conducted almost habitually with the lens cap mounted on the lens or with the lens covered with a hand to prevent light introduction into the lens. In case of a camera in which the exposure time is controlled by the measured intensity of the light incoming from the object field through the taking lens, long exposures are instructed during such fictitious shots. Such long exposures not only prolong the time required for the fictitious shots but also lead to the danger of erroneous film winding operation while the shutter is still open.

On the other hand cameras with automatic exposure control are often equipped with a circuit for automatically selecting an exposure time suitable for flash photographing in response for example to the mounting of a strobe flash unit to the camera. Such circuit is quite inefficient as it is used only for flash photographing.

SUMMARY OF THE INVENTION

Thus the object of the present invention is to provide a shutter actuating device capable of utilizing such flash photographing circuit for eliminating the long exposures during the fictitious shots, thereby allowing easy and safe conduct of such fictitious shots. Other objects and features of the present invention will become fully apparent from the following detailed description of some embodiments taken in conjunction with the accompanying drawings.

DETAILED DESCRIPTION OF THE PREFERRED EMBODIMENTS

Now the present invention will be clarified in detail by description of an embodiment thereof.

Figure 1:
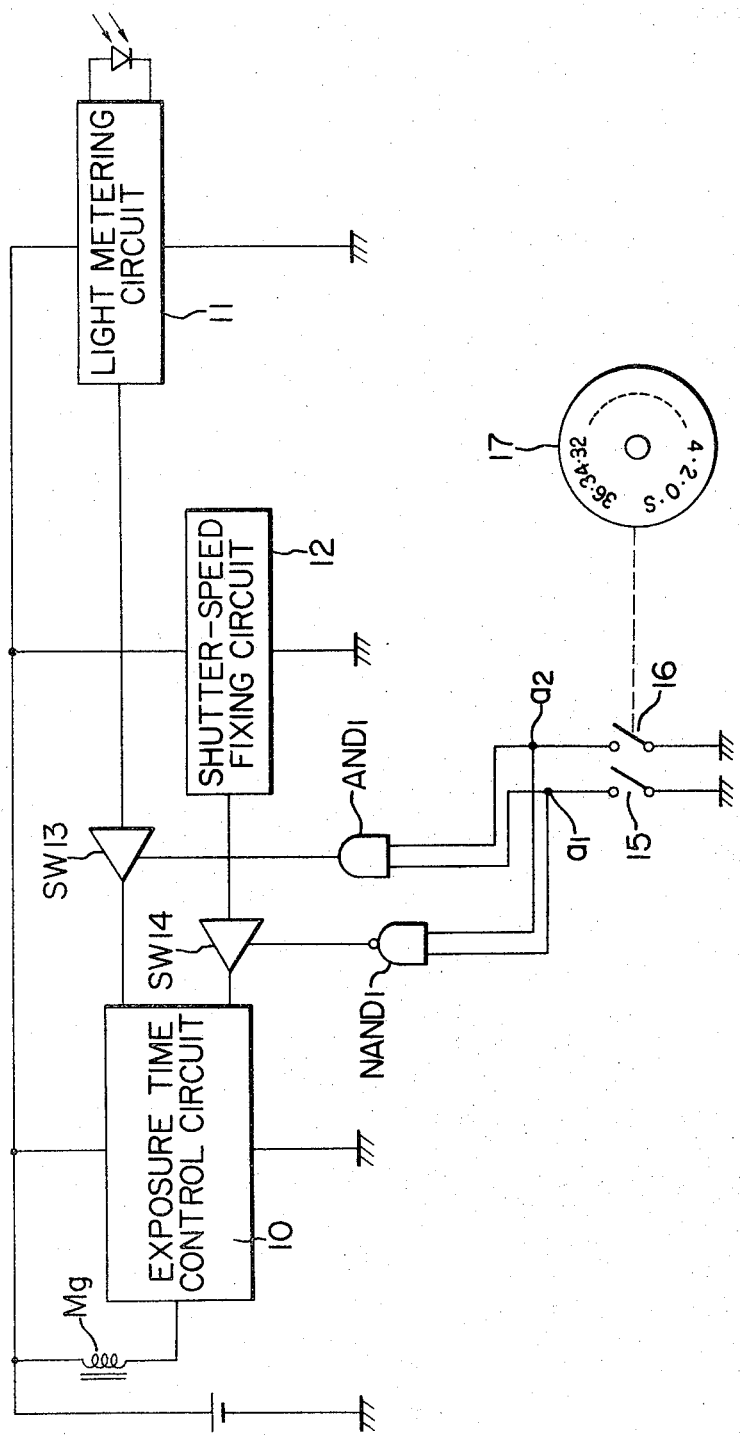
FIG. 1 is a circuit diagram showing a first embodiment of the present invention.

FIG. 1 shows a first embodiment of the present invention in which an exposure time control circuit 10 controls, in response to the output signal from a light metering circuit 11 corresponding to the brightness of the object or to the output signal from a shutter-speed fixing circuit 12 corresponding to a shutter speed (for example 1/90 or 1/125 sec.) suitable for flash photographing, the energizing time of solenoid Mg for retaining the trailing shutter curtain, thereby controlling the exposure time. Thus said circuits 10 and 11 constitute a first exposure time control circuit, while said circuits 10 and 12 constitute a second exposure time control circuit. An analog switch SW13 is placed between said circuits 10 and 11, while another analog switch SW14 is provided between said circuits 10 and 12.

A switch 15 is closed or opened respectively when a strobe flash unit is mounted on the camera body or detached therefrom, thereby providing a logic-0 or logic-1 output signal to a junction point a1. A switch 16, linked to a film frame number indicating device 17, is closed when said indicating device indicates a non-usable range where photography is impossible or the fictitious shots are required, and said switch 16 is opened when said indicating device indicates an usable range allowing the photographing operation, thus respectively providing a logic-0 or logic-1 output signal to a junction point a2.

Said output signals at the junction points a1 and a2 are supplied to a NAND gate NAND1 for controlling the analog switch SW14 and to an AND gate AND1 for controlling the analog switch SW13.

The above-explained circuit functions in the following manner:

| a1 | a2 | NAND1 | AND1 | SW13 | SW14 |
|----|----|-------|------|------|------|
| 0  | 0  | 1     | 0    | off  | on   |
| 0  | 1  | 1     | 0    | off  | on   |
| 1  | 0  | 1     | 0    | off  | on   |
| 1  | 1  | 0     | 1    | on   | off  |

Thus the analog switch SW14 is closed when the strobe flash unit is mounted and/or in case of the fictitious shots whereby the output signal from the circuit 12 is supplied to the exposure time control circuit 10 to select a shutter speed suitable for flash photography or a fixed shutter speed irrespective of the brightness of the object during the fictitious shots. Also when the strobe flash unit is detached or upon completion of the fictitious shots, the analog switch SW13 is closed to select a shutter speed corresponding to the brightness of the object.

Figure 2:
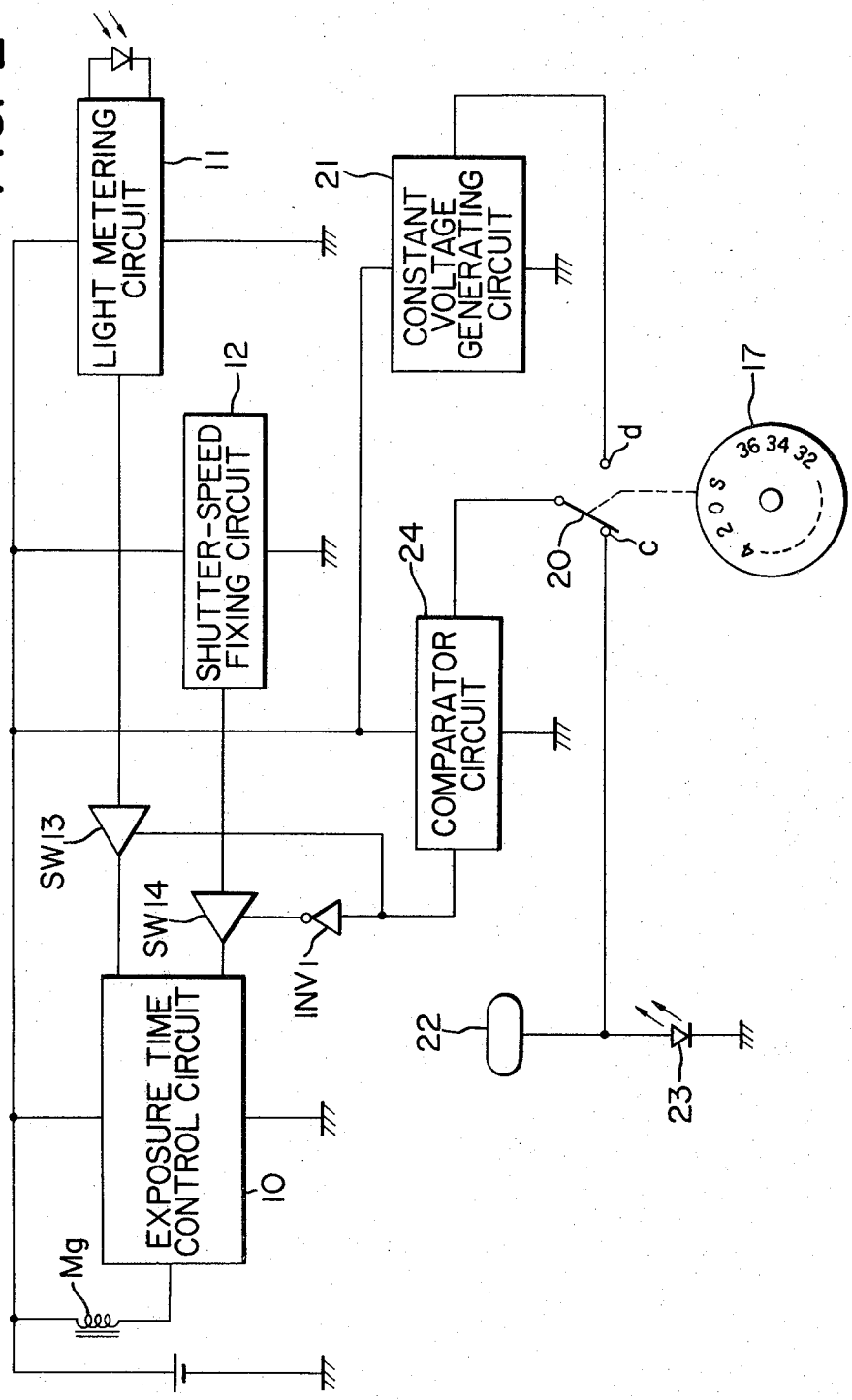
FIG. 2 is a circuit diagram showing a second embodiment of the present invention.

FIG. 2 shows a second embodiment of the present invention in which the analog switches SW13 and SW14 are respectively opened and closed when the strobe flash unit becomes ready for photography and wherein the indicating device 17 indicates an usable range.

In this embodiment a switch 20 linked to the film frame number indicating device 17 is connected to a contact d or c respectively when said indicating device indicates the non-usable range or the usable range, wherein said contact d receives an output voltage from a constant voltage generating circuit 21. A terminal 22 to be connected to the strobe flash unit detects the charging voltage of said unit and supplies a current to activate a light-emitting diode 23 upon completion of the charging. Also said contact receives a forward voltage of said light-emitting diode 23.

Said switch 20 is connected to a comparator circuit 24 which generates a logic-0 output signal in response to the output voltage from said constant voltage generating circuit 21 or a high voltage capable of activating the light-emitting diode 23, or a logic-1 output signal in response to a low voltage insufficient for activating said light-emitting diode 23.

When the indicating device 17 indicates the non-usable range regardless of whether the strobe flash unit is mounted on or detached from the camera body, the switch 20 is connected to the contact d whereby the comparator circuit 24 releases a logic-0 output signal in response to the high voltage from the circuit 21. Consequently the analog switch 13 is opened while the analog switch SW14 is closed in response to the output signal supplied through an inverter INV1, whereby the exposure time control circuit 10 receives the output signal from the exposure time fixing circuit 12.

On the other hand when the indicating device 17 indicates the usable range wherein the switch 20 is connected to the contact c, the comparator circuit 24 receives a low voltage to release a logic-1 output signal when the strobe flash unit is not mounted or not charged sufficiently, whereby the analog switches SW13 and SW14 are respectively closed and opened. Also upon completion of the charging of said flash unit, the comparator circuit 24 receives a high voltage whereby the switches SW13 and SW14 are respectively opened and closed.

The contact C receives a forward voltage not only when the light-emitting diode 23 is activated in response to the completion of the charging of the flash unit, but also when a forward current insufficient for activating said diode is supplied from the terminal 22. It is therefore possible to select a shutter speed suitable for flash photography even when the strobe flash unit is not completely charged but charged to a voltage allowing the flash emission, and with such structure it is rendered possible to avoid unexpected long exposure time in flash photography and to provide, in such state, a photograph with somewhat lowered exposure level instead of a completely mis-exposed photograph.

We claim:

1. In a photographic camera comprising an exposure time control circuit for controlling the shutter speed in response to the brightness of the object, a film frame number indicating device capable of indicating an usable range for frames allowing photographing operation and a non-usable range for frames not allowing photographing operation, a second exposure time control circuit for controlling the shutter with a shutter speed suitable for flash photographing and means for controlling the shutter to a shutter speed independent from the shutter speed determined by said exposure time control circuit when said indicating device indicates said non-usable range, an improvement wherein said means for controlling the shutter comprise switch means for selecting the shutter speed control by the aforementioned exposure time control circuit or by said second exposure time control circuit in response to the indication of said indicating device in such a manner that the shutter is controlled by the shutter speed determined by said second exposure time control circuit when said indicating device indicates said non-usable range.

2. An improvement in the photographic camera according to the claim 1, further comprising:
    (a) connecting means for connecting a flash unit for said flash photographing; and
    (b) means for controlling said switch means in such a manner as to control the shutter by the shutter speed determined by said second exposure time control circuit in response to the connection of said flash unit even when said indicating device indicates said usable range.

3. An improvement in the photograhic camera according to the claim 1, further comprising:
    (a) connecting means for connecting a flash unit for said flash photographing;
    (b) means for detecting the charged voltage of said flash unit connected to the camera; and
    (c) means for controlling said switch means in such a manner as to control the shutter by the shutter speed determined by said second exposure time control circuit in response to the output from said detecting means even when said indicating device indicates said usable range.

4. An improvement in the photographic camera according to the claim 1, wherein said switch means comprising:
    (a) a first analog switch for controlling said exposure time control circuit;
    (b) a second analog switch for controlling said second exposure time control circuit;
    (c) actuating means for selectively closing either one of said first and second analog switches in response to an input voltage level supplied to said actuating means;
    (d) first voltage generating means;
    (e) second voltage generating means; and
    (f) a switch supplying the output signal either from said first or second voltage generating means to said actuating means in response to the indication of said indicating device.

5. An improvement in the photographic camera according to the claim 4, wherein said second voltage generating means comprising:
    (a) means for connecting a flash unit for said flash photographing; and
    (b) means for detecting the charged voltage of said connected flash unit and releasing an output signal corresponding to said charged voltage.

* * * * *